(12) United States Patent
Nara

(10) Patent No.: US 6,961,151 B1
(45) Date of Patent: Nov. 1, 2005

(54) IMAGE READING-OUT APPARATUS, COPYING MACHINE AND FACSIMILE DEVICE UTILIZING THE SAME, AND METHOD OF READING OUT IMAGE

(75) Inventor: Wataru Nara, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 968 days.

(21) Appl. No.: 09/662,173

(22) Filed: Sep. 14, 2000

(30) Foreign Application Priority Data

Sep. 14, 1999  (JP) ................................. 11-259784

(51) Int. Cl.$^7$ ......................... H04N 1/407; H04N 1/409
(52) U.S. Cl. ..................... 358/3.26; 358/406; 358/445; 358/461; 358/463
(58) Field of Search .............................. 358/3.26, 3.27, 358/1.9, 461, 463, 464, 443, 445, 446, 406, 358/465, 466, 447; 348/251, 241, 243; 382/274, 382/275, 270

(56) References Cited

FOREIGN PATENT DOCUMENTS

JP         09154019 A  *  6/1997   .......... H04N 1/407

* cited by examiner

Primary Examiner—Scott A. Rogers
(74) Attorney, Agent, or Firm—Oblon, Spivak, McClelland, Maier & Neustadt, P.C.

(57) ABSTRACT

An image reading-out apparatus including a background level detecting circuit, an analog-to-digital converter, and a black-shading compensation circuit. The background level detecting circuit is configured to detect the background level of the original document from the image data. The analog-to-digital converter is configured to remove an influence due to the color of the background on the original document from the image data and configured to perform the analog-to-digital conversion of the image data in accordance with the detected background level. The black-shading compensation circuit is configured to perform black-shading compensation of the image data after the analog-to-digital conversion. The black-shading compensation circuit includes plural black level values calculating circuits which are configured to respectively obtain, per each one line, black level values employed for the black-shading compensation from the image data by use of respective different calculation members; a selection circuit which is configured to select and output one black level value among plural sorts of the black level values outputted by the plural black level values calculating circuits; and a subtracter which is configured to subtract the selected black level value from the image data after performing the analog-to-digital conversion and the black-shading compensation.

25 Claims, 5 Drawing Sheets

FIG. 6

| ANALOG AMOUNT | | | DIGITAL AMOUNT | | | | | Do | |
|---|---|---|---|---|---|---|---|---|---|
| Vref | Vin | Voph | Din | Doph | Db | M | | AT THE TIME OF Dopb | AT THE TIME OF Db |
| 1.65 | 1.5 | 0.1 | 232 | 15 | 15 | 0.455 | | 217 | 217 |
| 1.65 | 1.5 | 0.1 | 232 | 15 | 15 | 0.341 | | 217 | 217 |
| 1.65 | 1.5 | 0.1 | 232 | 15 | 15 | 0.256 | | 217 | 217 |
| 1.65 | 1.5 | 0.1 | 232 | 15 | 15 | 0.192 | | 217 | 217 |
| 1.65 | 1.5 | 0.1 | 232 | 15 | 15 | 0.144 | | 217 | 217 |
| 1.98 | 1.8 | 0.1 | 232 | 13 | 15 | −0.392 | | 219 | 217 |
| 1.98 | 1.8 | 0.1 | 232 | 13 | 14 | 0.206 | | 219 | 218 |
| 1.98 | 1.8 | 0.1 | 232 | 13 | 14 | −0.096 | | 219 | 218 |
| 1.98 | 1.8 | 0.1 | 232 | 13 | 14 | −0.322 | | 219 | 218 |
| 1.98 | 1.8 | 0.1 | 232 | 13 | 14 | −0.491 | | 219 | 218 |
| 1.98 | 1.8 | 0.1 | 232 | 13 | 13 | 0.382 | | 219 | 219 |
| 1.98 | 1.8 | 0.1 | 232 | 13 | 13 | 0.286 | | 219 | 219 |
| 1.98 | 1.8 | 0.1 | 232 | 13 | 13 | 0.215 | | 219 | 219 |
| 1.98 | 1.8 | 0.1 | 232 | 13 | 13 | 0.161 | | 219 | 219 |
| 1.98 | 1.8 | 0.1 | 232 | 13 | 13 | 0.121 | | 219 | 219 |
| 1.98 | 1.8 | 0.1 | 232 | 13 | 13 | 0.091 | | 219 | 219 |
| 1.98 | 1.8 | 0.1 | 232 | 13 | 13 | 0.068 | | 219 | 219 |
| 1.98 | 1.8 | 0.1 | 232 | 13 | 13 | 0.051 | | 219 | 219 |
| 1.98 | 1.8 | 0.1 | 232 | 13 | 13 | 0.038 | | 219 | 219 |
| 1.98 | 1.8 | 0.1 | 232 | 13 | 13 | 0.029 | | 219 | 219 |

IMAGE READING-OUT APPARATUS, COPYING MACHINE AND FACSIMILE DEVICE UTILIZING THE SAME, AND METHOD OF READING OUT IMAGE

BACKGROUND OF THE INVENTION

1. Field of the Invention

The present invention relates to an image reading-out apparatus, in particular, an image reading-out apparatus for exposing and scanning an original document to read out the image on the original document and thereby obtaining image data. Further, the present invention relates to a copying machine and a facsimile device which include the image reading-out apparatus. Furthermore, the present invention relates to a method of reading out an image.

2. Discussion of the Background

Hitherto, in the image reading-out apparatus for creating the image data from the image on the original document by use of the opto-electric conversion element such as CCD (Charge Coupled Device), the black-shading compensation has been performed for the image data.

Namely, the image data outputted from the CCD are composed of a signal component of dark current not changing in accordance with the light receiving amount from the CCD and another signal component changing in accordance with the same. Since the signal component effective for the image processing is only the signal component changing in accordance with the light receiving amount of the CCD, the black-shading compensation is performed by subtracting the signal component of the dark current (black level value) from the image data outputted by the CCD.

The black level value can be obtained line by line in average the output of the optical black (OPB) portion provided in a part of the CCD (tip end portion in the main scanning direction), for instance, before reading out the original document by use of the CCD. Moreover, the OPB portion in the CCD is, for instance, the part in which the surface of only the several pieces of pixels at the side of starting the scan in the main scanning direction, for instance, among the pixels of the optoelectric conversion elements arranged in a row of the CCD is vaporized with aluminum, and thereby the black level value can be obtained.

However, the background level of the original document is detected from the image data outputted from the CCD and the image data are changed in accordance with the background level of the original document on which the reference voltage of the analog-to-digital (A/D) converter at the time of the A/D conversion, and thereby the following of the black standard level detection at the black-shading compensation is delayed and the unevenness of the density occurs in the image in the case of adopting the member of removing the influence exerted on the background color of the original document from the image data. This is the troublesome matter to be solved.

Furthermore, in the system required the real-time property to perform line by line the black-shading compensation, since the number of the pixels of the optoelectric element which can be used in the OPB portion is limited, the unevenness occurs in the average value of the black level value in the image reading-out apparatus of the unpreferable S/N ratio. As the result, since the black-shading compensation differs per each line, even though the black level lines exist successively in the sub-scanning direction, the black data level differs per each line on the read-out image data and thereby the transverse stripe occurs on the image. This is also the troublesome matter to be solved.

One of the methods of solving the above matter is to improve the aforementioned S/N ratio. However, it is very difficult in consideration of the cost and technical matters. It can be thought to adopt the other method of eliminating the real time property to perform line by line the black-shading compensation as mentioned before. However, according to this method, the system employed hitherto has to be largely changed.

Heretofore, the background arts regarding the image reading-out apparatus and the copying machine and facsimile device both including the image reading-out apparatus have been described. However, according to such background arts, there exists no advantageous functional effect for improving the image reading-out apparatus.

SUMMARY OF THE INVENTION

According to the present invention, high quality of the image can be realized, by performing the processing corresponding to the sorts of the image processing after the black-shading compensation. Furthermore, the occurrence of the transverse stripe of the image can be prevented, and the occurrence of the density unevenness of the image can be also prevented. Thereby, the high quality of the image can be realized. Moreover, when the image processing of amplifying the comparative influence of the image data noise is performed, when the image processing not apt to be affected comparatively by the image data noise is performed, when the MTF compensation is performed, and when the smoothing processing is performed, the high quality of the image can be realized.

In the first aspect of the invention, an image reading-out apparatus for exposing and scanning an original document to read out the image on the original document and thereby obtaining image data includes: a background level detecting circuit for detecting the background level of the original document from the image data; an analog-to-digital converter for removing an influence due to the color of the background on the original document from the image data and performing the analog-to-digital conversion of the image data in accordance with the detected background level; and a black-shading compensation circuit for performing black-shading compensation of the image data after the analog-to-digital conversion.

The black-shading compensation circuit includes: plural black level values calculating circuits for respectively obtaining, per each one line, black level values employed for the black-shading compensation from the image data by use of respective different calculation members; a selection circuit for selecting and outputting one black level value among plural sorts of black level values outputted by the plural black level values calculating circuits; and a subtracter for subtracting the selected black level value from the image data after the analog-to-digital conversion and performing the black-shading compensation.

In such structure, it is possible to select the optimum one among the plural black level values obtained by the different members and perform the black-shading compensation.

In the second aspect of the invention, the image reading-out apparatus in connection with the first aspect further includes a control member for performing the selection for the image data by use of the selection circuit in accordance with the sorts of the processing performed at the stage subsequent to that of the black-shading compensation circuit.

In such structure, it is possible to select the optimum one among the plural black level values in accordance with the sorts of the image processing performed after the black-shading compensation.

In the image reading-out apparatus of the third aspect in connection with the second aspect, one of the plural black level values calculating circuits is the first calculation circuit for calculating the black level value on the basis of the image data per one line inputted this time and the image data per one or plural lines inputted until last time; and another one of the plural black level values calculating circuits is the second calculation circuit for calculating the black level value only on the basis of the image data per one line inputted this time.

In such structure, by using the black level value calculated on the basis of the image data of one line inputted this time and the image data of one or plural lines inputted until last time, the occurrence of the transverse stripe on the image can be easily prevented with low cost. Furthermore, by using the black level value calculated on the basis of only the image data of one line inputted this time, the occurrence of the density unevenness can be suppressed.

In the image reading-out apparatus of the fourth aspect in connection with the third aspect, the sorts of processings performed at the stage subsequent to that of the black-shading compensation circuit include first processing and second processing; the first processing is a processing of amplifying the influence exerted by the noise on the image data to a larger extent than the second processing; the second processing is a processing of being less apt to be affected by the noise than the first processing; in the case of performing the first processing, the control member causes the black level from the first calculation circuit to be outputted from the selection circuit; and in the case of performing the second processing, the control member causes the black level from the second calculation circuit to be outputted from the selection circuit.

In such structure, when the image processing of amplifying the comparative influence of the noise of the image data, the occurrence of the transverse stripe of the image can be simply prevented with low cost. Furthermore, when the image processing not apt to be comparatively affected by the noise of the image data is performed, the occurrence of the density unevenness of the image can be suppressed.

In the image reading-out apparatus of the fifth aspect in connection with the fourth aspect, the first processing is an MTF compensation.

Consequently, when the MTF compensation of amplifying the comparative influence of the noise of the image data is performed, the occurrence of the transverse stripe of the image can be easily prevented with low cost.

In the image reading-out apparatus in connection with fourth or fifth aspect, the second processing is a smoothing processing.

Consequently, when the smoothing processing not apt to be comparatively affected by the noise of the image data, the occurrence of the density unevenness of the image can be suppressed.

The copying machine of the seventh aspect of the invention is provided with an image reading-out apparatus in connection with either one of the first through sixth aspects; and an image forming apparatus for forming an image on the basis of the image data obtained by the image reading-out apparatus.

Consequently, in the copying machine, it is possible to attain the same functional effect as that described in either one of the first through sixth aspects.

The facsimile device of the eighth aspect of the invention is provided with an image reading-out apparatus in connection with either one of the first through sixth aspects; a transmitting/receiving apparatus for transmitting the image data obtained by the image reading-out apparatus to a network and receiving the image data from the network; and an image forming apparatus for forming the image on the basis of the image data received by the transmitting/receiving apparatus.

Consequently, in the facsimile device, it is possible to attain the same functional effect as that described in either one of the first through sixth aspects.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 is a table showing an example of calculation in the duplicate addition average value calculating circuit.

DETAILED DESCRIPTION OF THE PREFERRED EMBODIMENTS

Figure 1:
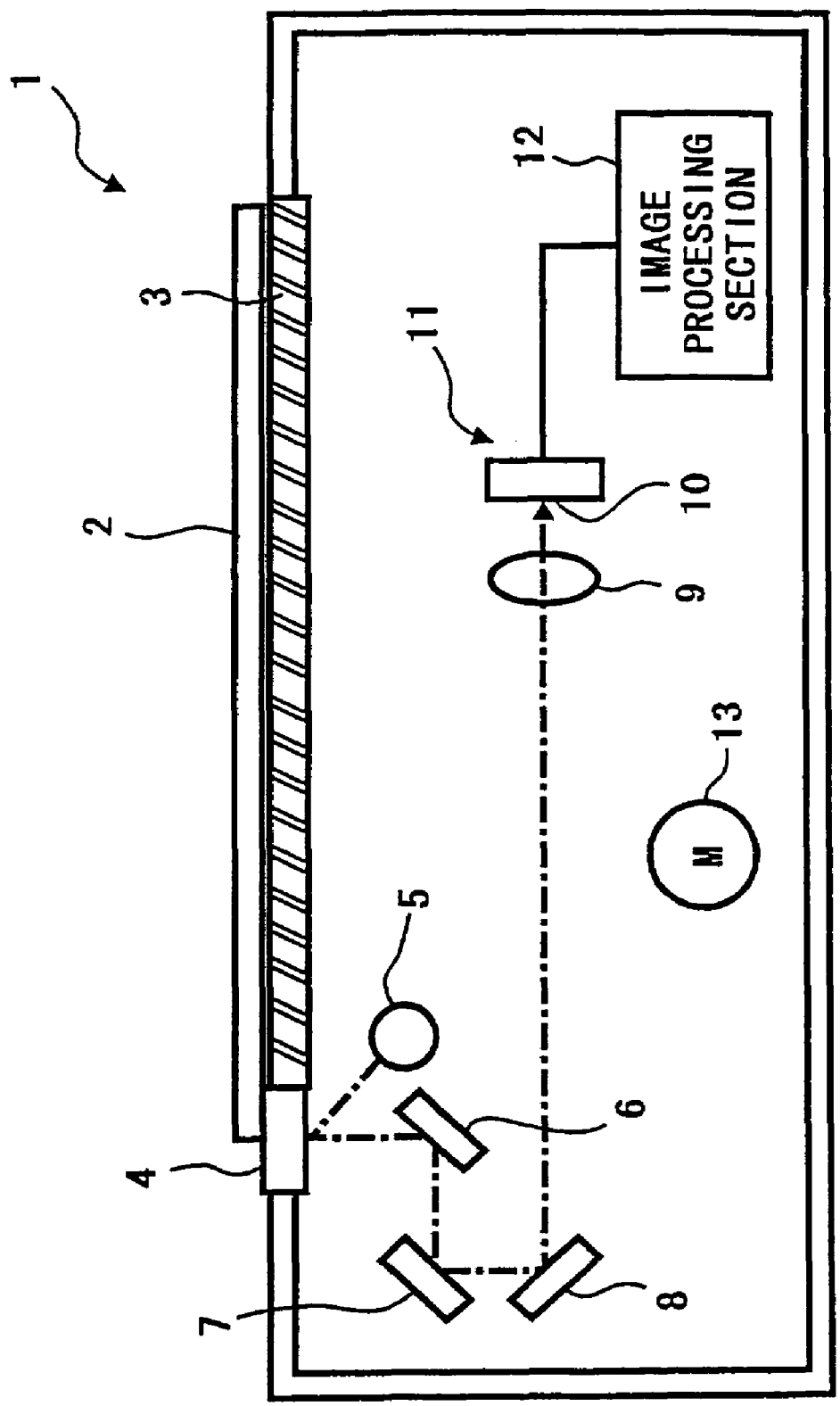
FIG. 1 is an outlined view illustrating the concept of the image reading-out apparatus according to the first embodiment of the present invention.

In describing the preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Referring now to the drawings; wherein like reference numerals designate identical or corresponding parts throughout the several views (diagrams), and more particularly to FIGS. 1 through 6 thereof, there are illustrated the improved image reading-out apparatus, and the copying machine and the facsimile device both employing the above image reading-out apparatus.

FIG. 1 illustrates the concept of the image reading-out apparatus according to the first embodiment of the present invention. On the upper surface portion of the housing of the image reading-out apparatus 1, there are provided a contact glass 3 for putting an original document 2 thereon and a white standard plate 4 for use in the white-shading compensation. The white standard plate 4 is an almost white member of a uniform density which is provided in the main scanning direction in order to obtain the compensation data at the time of the shading compensation. The original document 2 is pressed by a pressing plate not shown from the upper side so as not to float from the contact glass 3.

A light source 5 radiates the light at an angle toward the reading-out surface of the white standard plate 4 and the contact glass 3. The light reflected on the white standard plate 4 or the original document 2 is directed to an opto-electric conversion element CCD 10 as an incident light through three mirrors 6, 7, and 8 and a lens 9.

The light source 5 and the mirrors 6, 7, and 8 construct first and second moving bodies not shown. The distance between the reading-out surface of the original document 2 and the CCD 10 is kept constant by the driving of the motor 13, and the both moving bodies move in the sub-scanning direction. Thereby, the exposure and the scanning of the original document 2 is performed.

The CCD 10 outputs the voltage corresponding to the incident light amount (intensity) as the analog image data. The image data are treated with the predetermined processing of the A/D conversion, etc. by use of the circuit on the sensor board 11 on which the CCD 10 is provided, and thereafter, the image data thus treated are transferred to the image processing section 12 as the digital image signal.

Figure 2:
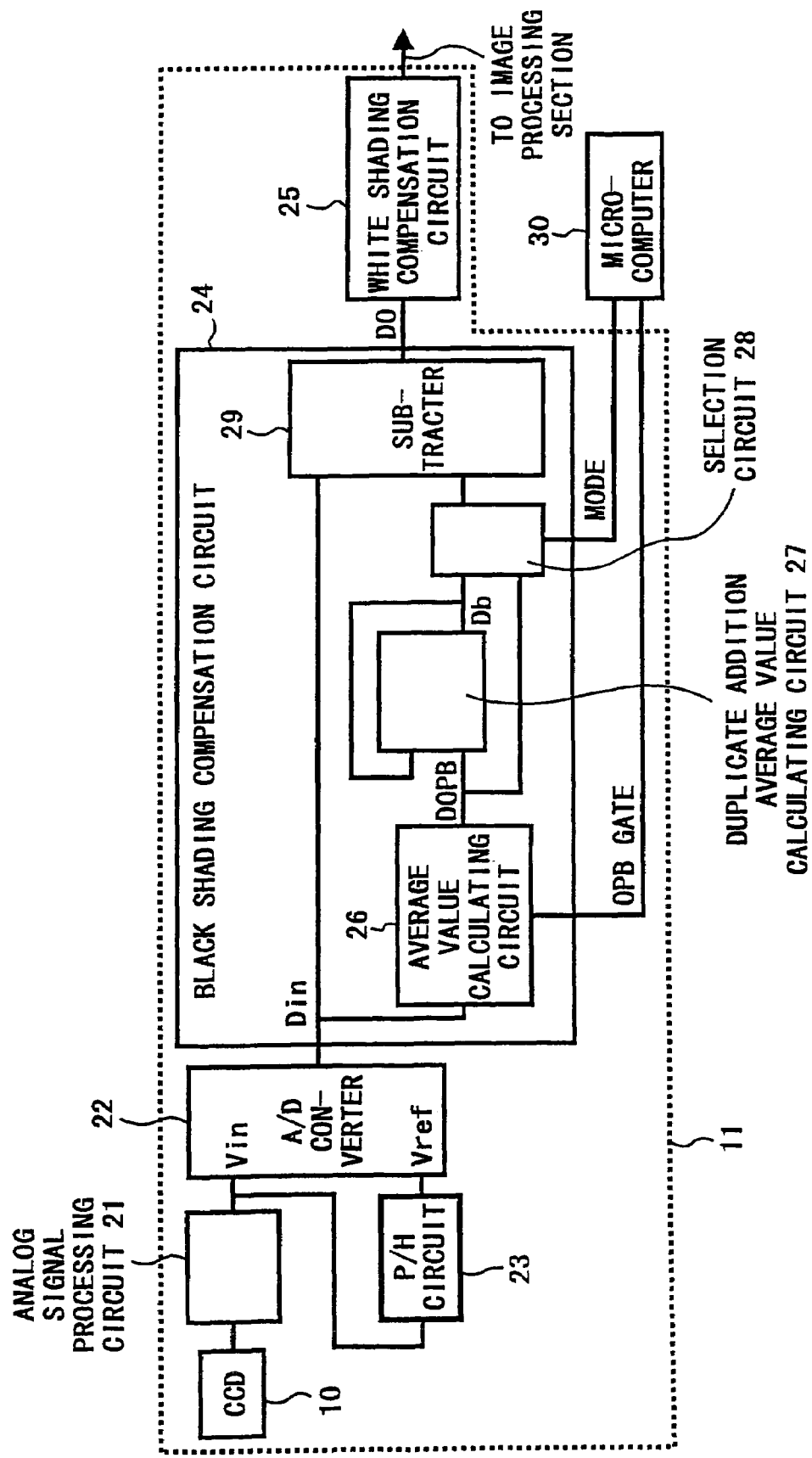
FIG. 2 is a block diagram illustrating the structure of the circuit on the sensor board of the image reading-out apparatus.

FIG. 2 is a block diagram for illustrating the construction of the circuit on the sensor board 11. As shown in FIG. 2, the analog image data outputted from the CCD 10 are treated with the AGC (Automatic Gain Control) processing by an analog signal processing circuit 21. Thereafter, the analog image data are converted to the digital image data by the A/D converter 22.

On that occasion, the peak value of the image data after the AGC processing is detected by the background level detecting circuit, that is, a peak/hold (P/H) circuit 23, and held as the signal showing the background level of the original document 2 at that time. And then, the output voltage of the peak/hold circuit 23 is treated with the reference voltage of the A/D converter 22, and thereby, following the detection of the background level of the original document 2, the influence exerted on the original document 2 due to the background color is removed from the image data. In such a way, the image data are converted to the digital data by the A/D converter 22.

The image data after the A/D conversion are treated with the black-shading compensation by use of the black-shading compensation circuit 24. (The detail thereof is described later.) The image data are further treated with the white-shading compensation by use of the white-shading compensation circuit 25. The image data thus compensated are outputted to the image processing section 12. Various image processings such as γ-compensation, color conversion, magnification/reduction treatment are performed in the image processing section 12.

The black-shading compensation circuit 24 is composed of an average value calculating circuit 26, a duplicate addition average value calculating circuit 27, a selection circuit 28, and a subtracter 29. The average value calculating circuit 26 and the duplicate addition average value calculating circuit 27 obtain the black level value employed for the black-shading compensation per one line of the image data with the respective different members, from the image data outputted by the A/D converter 22. The selection circuit 28 selectively outputs one of the black level value outputted by the average value calculating circuit 26 and the other black level value outputted by the duplicate addition average value calculating circuit 27. The subtracter 29 subtracts the black level value outputted by the selection circuit 28 from the black level value outputted by the A/D converter 22, and thereby the black-shading compensation of the image data is performed.

The average value calculating circuit 26 is the black level value calculating circuit serving as the second circuit, and the circuit 26 outputs the black level value on the basis of only the image data of one line inputted this time.

To state concretely, for instance, the output of the OPB portion provided in a part of the CCD 10 (tip end portion in the main scanning direction) is cut out by the control signal OPB GATE outputted from the microcomputer 30 for controlling the entire portion of the image reading-out apparatus 1. The output of the OPB portion thus cut out can be obtained in average per one line. The above matter is same as that of the aforementioned background art.

The duplicate addition average value calculating circuit 27 is the black level value calculating circuit serving as the first circuit, and the output of the average value calculating circuit 26 is inputted into the circuit 27. The black level value is calculated on the basis of the image data of one line inputted this time and the image data of one line inputted last time. To state concretely, for example, the black level is calculated as follows:

$$Db, n = Dopb, n/A + Db, n-1 \times (A-1)/A \quad (1),$$

wherein $Db,n$ is a black level value of n lines, $Dopb,n$ is an average value of OPB portion of n lines, and A is a constant (duplicate addition average coefficient). The black level value of n lines $Db,n$ can be obtained by performing the calculation of the above equation (1).

Here, assuming that the S/N ratio of the image reading-out apparatus 1 is bad (unpreferable) and the average value $Dopb,n$ of the black level value per one line of the image data becomes uneven, the average value $Dopb,n$ can be represented by the below equation (2).

$$Dopb, n = Db, n-1 + \alpha \quad (2),$$

wherein $\alpha$ is a variation component of the noise. By substituting the equation (1) by the equation (2), the following equation (3) can be obtained:

$$Dopb, n = Db, n-1 + \alpha/A \quad (3)$$

In the duplicate addition average value calculating circuit 27, the duplicate addition averaging is performed on the basis of the equation (1). As the result of the above averaging, it may become apparent that the influence of the above-mentioned noise is reduced to 1/A times. Namely, the output average value from the pixel of the OPB portion in the average value calculating circuit 26 is taken in the duplicate addition average value calculating circuit 27. Regarding the obtained black level value of the line unit, the duplicate addition average is further taken between plural lines. Thereby, keeping the real time property of detecting the black level value per line, the variation of the average value $Dopb,n$ of line unit outputted by the average value calculating circuit 26 can be suppressed and the influence of the noise contained in the image data can be also suppressed. Consequently, the transverse stripe does not appear on the image.

Here, since the image data do not include the data less than the decimal (fraction) point, it is necessary to prohibit the data outputted from the duplicate addition average value calculating circuit 27 as the black level value to have the data less than the decimal (fraction) point. Hereinafter, such treatment is called "totalizing treatment".

And then, assuming that the black level value before rounding to the nearest whole number is D'b,n, the following equations (4) and (5) can be obtained:

$$D'b,n = Db,n + Mn \quad (4)$$

$$Mn = \{Dopb,n + (Db,n-1+M_{n-1}) \times (A-1)\}/A - Db,n \quad (5),$$

wherein Mn can be represented as the surplus obtained by the calculation of the n-lines Dopb of rounding to the nearest whole number.

Consequently, the duplicate addition averaging treatment of performing the totalizing treatment can be realized by performing the calculation shown by the following equation (6) as an example:

$$Db,n = ROUND[\{Dopb,n + (Db,n-1+M_{n-1}) \times (A-1)\}/A] \quad (6),$$

wherein ROUND [ ] signifies the calculation symbol for performing the rounding to the nearest whole number for the number less than decimal fraction point.

In the equation (6), the black level value of the last-time (n−1) lines is added for the duplicate addition "(Db,n−1+$M_{n-1}$)", namely, the totalized error $M_{n-1}$ is added to the totalized value Db,n−1. Thereby, the data without any error before totalizing can be restored, and the calculation is performed on the basis of the value of the restored data.

Figure 3:
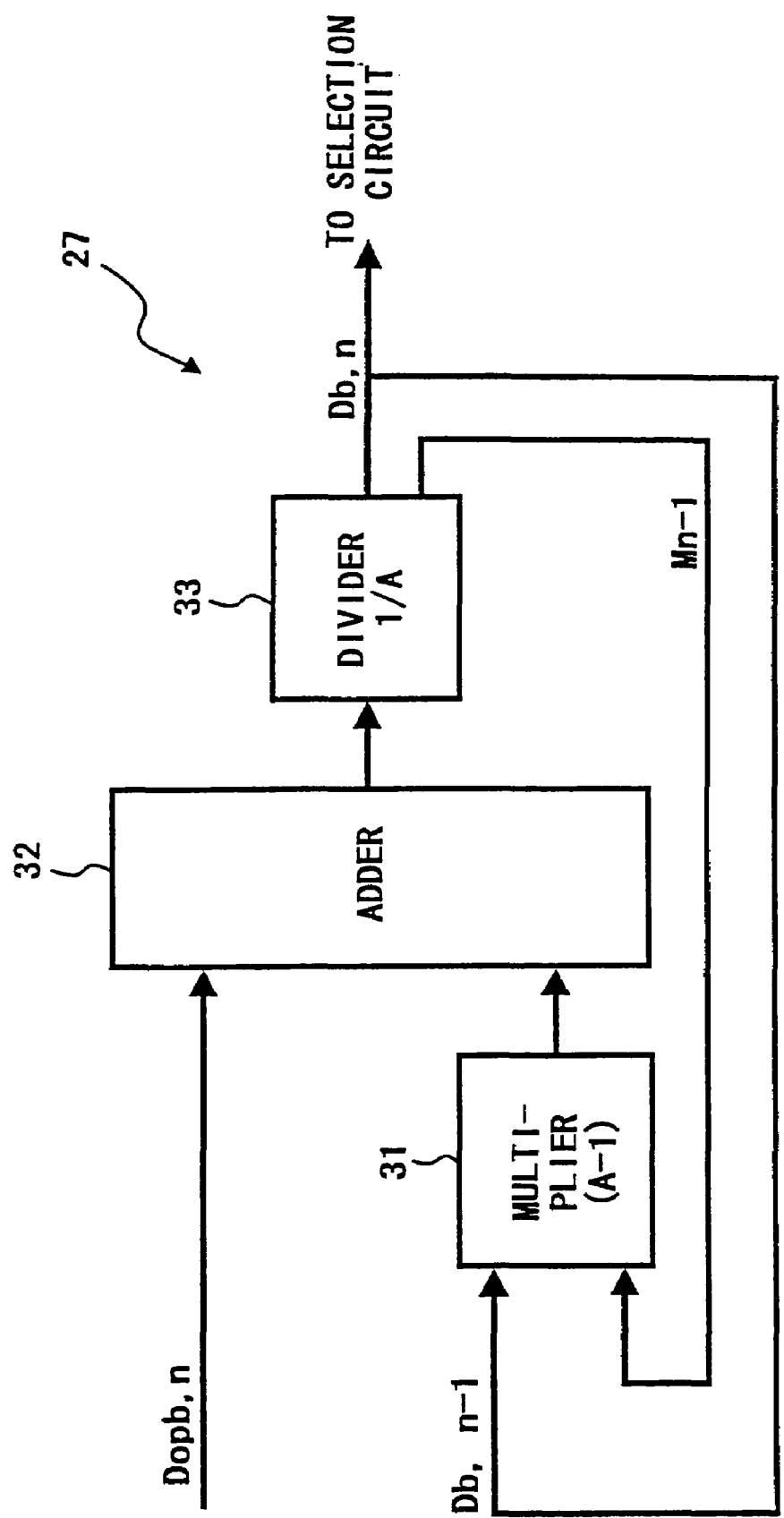
FIG. 3 is a block diagram illustrating the structure of the duplicate addition average value calculating circuit constructing the black-shading compensation circuit of the image reading-out apparatus.

FIG. 3 is a block diagram for illustrating the exemplary construction of the duplicate addition average value calculating circuit 27 for calculating the black level value Db,n by performing the calculation of the equation (6). The duplicate addition average value calculating circuit 27 as shown in FIG. 3 is constructed with a multiplier 31, an adder 32, and a divider 33. The final black level value Db,n after the calculation of the duplicate addition average value calculating circuit 27 is outputted from the divider 33. The black level value Db,n−1 on the last-time (n−1) lines outputted from the divider 33 and the totalized error $M_{n-1}$ at that time are outputted from the divider 33 and inputted to the multiplier 31.

The multiplier 31 multiplies the inputted value "(Db,n−1+$M_{n-1}$)", by (A−1). Thereby, the value "(Db,n−1+$M_{n-1}$) ×(A−1)" is obtained and outputted to the adder 32. The average value Dopb,n is inputted to the adder 32 from the average value calculating circuit 26. The average value Dopb,n is added to the value "(Db,n−1+$Mn_{n-1}$)×(A−1)", and the value {Dopb,n+(Db,n−1+$M_{n-1}$)×(A−1)} is obtained. The value thus obtained is outputted to the divider 33. The divider 33 divides "{Dopb,n+(Db,n−1+$M_{n-1}$)×(A−1)}" by A, in order to obtain "{Dopb,n+(Db,n−1+$Mn_{n-1}$)×(A−1)}/A". At this time, the surplus (Mn) less than the decimal fraction point obtained as the result of the division is treated with the rounding to the nearest whole number.

In such a way, since the duplicate addition average value calculating circuit 27 performs the totalizing treatment and the duplicate addition average value treatment, the following property of the black level value Db,n can be secured in accordance with the variation of the average value of the output of the OPB portion of the respective lines.

In such situation, as shown in FIG. 6 (TABLE 1) showing the calculation example in which A is made equal to 4 (A=4) in such duplicate addition average value calculating circuit 27, it is apparent that, when the reference voltage of the A/D converter 22 is changed in accordance with the density of the image, four lines are multiplied until the data after the duplicate addition follow, and regarding DO at the time of using Db, the density of the read-out image changes during this time period. Although this matter is not the thing to be noted in particular in the image quality mode of thinking much of the character, the matter is inevitably recognized as the step difference in the image quality mode of thinking much of the image density itself.

TABLE 1

| ANALOG AMOUNT | | | DIGITAL AMOUNT | | | | DO | |
|---|---|---|---|---|---|---|---|---|
| | | | | | | | AT THE TIME | AT THE TIME |
| Vref | Vin | Vopb | Din | Doph | Db | M | OF Dopb | OF Db |
| 1.65 | 1.5 | 0.1 | 232 | 15 | 15 | 0.455 | 217 | 217 |
| 1.65 | 1.5 | 0.1 | 232 | 15 | 15 | 0.341 | 217 | 217 |
| 1.65 | 1.5 | 0.1 | 232 | 15 | 15 | 0.256 | 217 | 217 |
| 1.65 | 1.5 | 0.1 | 232 | 15 | 15 | 0.192 | 217 | 217 |
| 1.65 | 1.5 | 0.1 | 232 | 15 | 15 | 0.144 | 217 | 217 |
| 1.98 | 1.8 | 0.1 | 232 | 13 | 15 | −0.392 | 219 | 217 |
| 1.98 | 1.8 | 0.1 | 232 | 13 | 14 | 0.206 | 219 | 218 |
| 1.98 | 1.8 | 0.1 | 232 | 13 | 14 | −0.096 | 219 | 218 |
| 1.98 | 1.8 | 0.1 | 232 | 13 | 14 | −0.322 | 219 | 218 |
| 1.98 | 1.8 | 0.1 | 232 | 13 | 14 | −0.491 | 219 | 218 |
| 1.98 | 1.8 | 0.1 | 232 | 13 | 13 | 0.382 | 219 | 219 |
| 1.98 | 1.8 | 0.1 | 232 | 13 | 13 | 0.286 | 219 | 219 |
| 1.98 | 1.8 | 0.1 | 232 | 13 | 13 | 0.215 | 219 | 219 |
| 1.98 | 1.8 | 0.1 | 232 | 13 | 13 | 0.161 | 219 | 219 |
| 1.98 | 1.8 | 0.1 | 232 | 13 | 13 | 0.121 | 219 | 219 |
| 1.98 | 1.8 | 0.1 | 232 | 13 | 13 | 0.091 | 219 | 219 |
| 1.98 | 1.8 | 0.1 | 232 | 13 | 13 | 0.068 | 219 | 219 |
| 1.98 | 1.8 | 0.1 | 232 | 13 | 13 | 0.051 | 219 | 219 |
| 1.98 | 1.8 | 0.1 | 232 | 13 | 13 | 0.038 | 219 | 219 |
| 1.98 | 1.8 | 0.1 | 232 | 13 | 13 | 0.029 | 219 | 219 |

In TABLE 1 (FIG. 6), the respective symbols represent the matters as follows:

Vin: Signal of reading out the Background Level of the Original Document (Analog Value)

Vref: Reference Voltage of the A/D Conveter

Vopb: Reading-out Voltage of the OPB Portion

Din: Image Data before the Black-shading Compensation

Dopb: Average Value of the OPB Portion per line

Db: Black Level Value obtained by the Equation (6)

DO: Image Data after the Black-shading Compensation

In such way, the black-shading compensation is performed by use of the black level value (Db in TABLE 1) outputted from the duplicate addition average value calculating circuit 27. As to the result thereof, refer to DO at the time of Db in TABLE 1 (FIG. 6). At this time, the occurrence of the image's transverse stripe caused by the noise is suppressed. However, the following property of the black level value to the reference voltage of the A/D converter 22 changing in accordance with the image density becomes bad (unpreferable). That results in the unevenness of the image density. However, it is apparent from the TABLE 1 that, when the black-shading compensation is performed by use of the black level value (Dopb in TABLE 1—FIG. 6) outputted from the average value calculating circuit 26. The result of the black-shading compensation is DO at the time of Dopb in the TABLE 1—FIG. 6. It is apparent from the TABLE 1 (FIG. 6) that, since the following property of the black level value to the reference voltage of the A/D converter 22 is preferable, the density unevenness of the image can be suppressed. Nevertheless, the transverse stripe is apt to occur on the image due to the noise on this occasion.

Here, in such image reading-out apparatus 1, the control signal MODE is outputted to the selection circuit 28 from the microcomputer 30 serving as the control member in accordance with the image processing mode performed by the image processing section in the subsequent stage of the black-shading compensation circuit 24. The image reading-out apparatus 1 selects a suitable one of the black level signal outputted by the average value calculating circuit 26 and the black level signal outputted by the duplicate addition average value calculating circuit 27. The selected signal is outputted to the subtracter 29.

To state concretely, when the image processing mode performed in the image processing section 12 is the mode in which the image recording (imaging) is thought much thereof and the MTF compensation (first processing), etc. becomes a little strong mode, the influence of the noise in the image data is apt to be amplified. Therefore, even though the black level value Db outputted from the duplicate addition average value calculating circuit 27 is employed and the following property of the black level value to the reference voltage of the A/D converter 22 is sacrified, the transverse stripe occurring on the image due to the noise can be suppressed.

Furthermore, when the mode of the image processing performed in the image processing section 12 is the mode of thinking much of the density reproduction (restoring) and performing the smoothing process (second processing), since the image processing is not apt to be affected by the noise contained in the image data, the black level value Dopb outputted from the average value calculating circuit 26 is employed and the density unevenness of the image is suppressed.

In such a way, the black level signal employed for the black shading compensation is used property in accordance with the mode of the image processing performed in the image processing section 12, and thereby it is possible to intend to realize a high-quality image.

Moreover, in the embodiment of the present invention, an example of realizing the respective circuits constructing the invention with the hardware has been described heretofore. However, it may be possible to realize all of or a part of the circuit with the software.

Furthermore, although an example of a flat bed scanner has been described in the embodiment, the present invention can be applied to a handy scanner or other(s).

Figure 4:
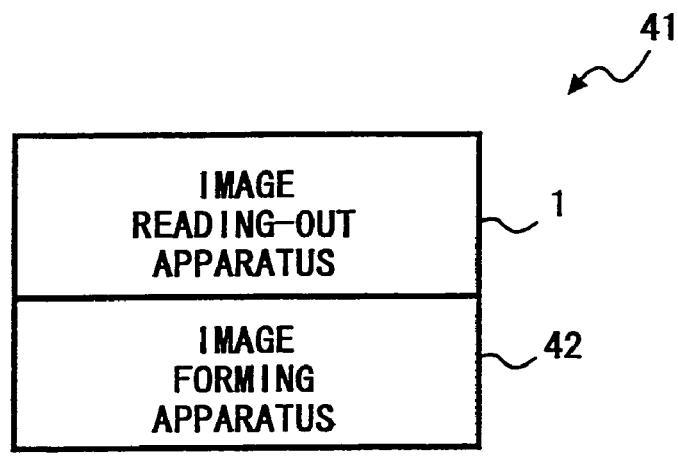
FIG. 4 is a block diagram illustrating the outlined structure of the copying machine according to the second embodiment of the present invention.

FIG. 4 is a block diagram for illustrating the outlined structure of a copying machine which is a second embodiment of the present invention. The copying machine 41 is provided with the aforementioned image reading-out apparatus 1 and an image forming apparatus 42 for performing the image formation on the basis of the image acquired in the image reading-out apparatus 1.

A laser system performing the image formation with the electrophotographic method or other various sorts of the image forming method can be used in the image forming apparatus 42.

Even in the copying machine 41, the high-quality image can be intended to realize, as in the case of the first embodiment of the present invention.

Figure 5:
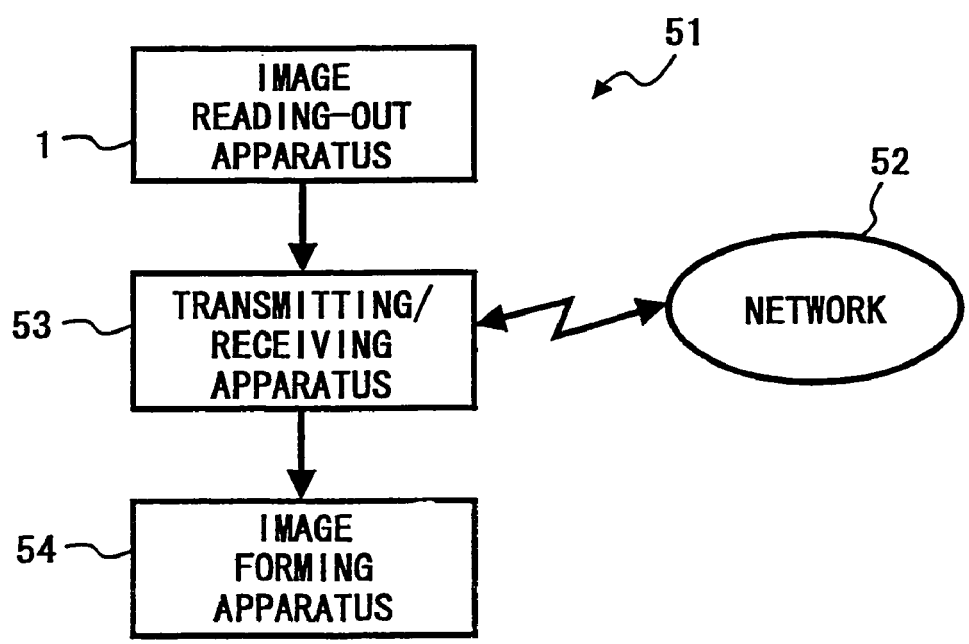
FIG. 5 is a block diagram illustrating the outlined structure of the facsimile device according to the third embodiment of the present invention.

FIG. 5 is a block diagram for illustrating the outlined structure of a facsimile device which is a third embodiment of the present invention. The facsimile device 51 is provided with the aforementioned image reading-out apparatus 1, a data transmitting/receiving apparatus 53 for transmitting the image data acquired in the image reading-out apparatus 1 to the network 52 such as the telephone circuit and receiving the image data from the network 52, and an image forming apparatus 54 performing the image formation on the basis of the image data received by the data transmitting/receiving apparatus.

In the image forming apparatus 54, the laser system performing the image formation with the electrophotographic method or the other various sorts of the image forming method can be used. Even in the facsimile device 51, the high quality image can be intended to realize, as in the cases of the first and second embodiments of the present invention.

Heretofore, the first, second, and third embodiments of the invention have been concretely described. In those embodiments, various advantageous functional effects can be attained.

The black-shading compensation in the first aspect of the invention can be performed by selecting the optimum value among the plural black levels obtained by the different unit sections. Consequently, the high-quality image can be realized.

In the image reading-out apparatus of the second aspect of the invention in connection with the first aspect, the black shading compensation is performed by selecting the optimum one among the plural black level values in accordance with the sort of the image processing performed after the black-shading compensation. Consequently, the high-quality image can be realized.

In the image reading-out apparatus of the third aspect of the invention in connection with the second aspect, the black level value calculated on the basis of the image data of one line inputted this time and the image data of one or plural lines inputted until last time, is employed, and thereby the occurrence of the transverse stripe of the image can be simply prevented with low cost. Furthermore, the black level value calculated on the basis of only the image data of one line inputted this time, and thereby the occurrence of the density unevenness of the image can be suppressed. Consequently, the high-quality image can be realized.

In the image reading-out apparatus of the fourth aspect of the invention in connection with the third aspect, when the image processing is performed so as to amplify the comparative influence of the noise exerted on the image data, the occurrence of the transverse stripe of the image can be simply prevented with low cost. On the contrary, when the image processing is performed so as not to be apt to be comparatively affected by the noise on the image data, the occurrence of the density unevenness of the image can be suppressed. Consequently, the high-quality of the image can be realized.

In the image reading-out apparatus of the fifth aspect of the invention in connection with the fourth aspect, when the MTF compensation is performed so as to amplify the comparative influence of the noise exerted on the image data, the occurrence of the transverse stripe of the image can be simply prevented with low cost. Consequently, the high-quality of the image can be realized.

In the image reading-out apparatus of the sixth aspect of the invention in connection with the fourth or fifth aspect, when the smoothing image processing is performed so as not to be apt to be comparatively affected by the noise on the image data, the occurrence of the density unevenness of the image can be also suppressed. Consequently, the high-quality image can be realized.

In the copying machine of the seventh aspect of the invention, the same advantageous functional effect as that of the first through sixth aspects can be realized.

In the facsimile device of the eighth aspect of the invention, the same advantageous functional effect as that of the first through six aspects can be realized.

The preferred embodiments of the present invention have been described heretofore. However, numerous additional modifications and variations of the present invention are possible in light of the above teachings. It is therefore to be understood that, within the scope of the appended claims, the present invention may be practice otherwise than as specifically described herein.

This application claims benefit of priority under 35 U.S.C 120 to Japanese Patent Application No. 11-259784 filled in the Japanese Patent Office on Sep. 14, 1999, the entire contents of which are incorporated by reference.

What is claimed is:

1. An image reading-out apparatus for exposing and scanning an original document to read out an image on said original document and thereby obtaining image data, comprising:

a background level detecting circuit configured to detect a background level of said original document from said image data;

an analog-to-digital converter configured to remove an influence due to a color of said background level on said original document from said image data and configured to perform an analog-to-digital conversion of said image data in accordance with said detected background level; and a black-shading compensation circuit configured to perform a black-shading compensation of said image data after said analog-to-digital conversion, wherein said black-shading compensation circuit comprises:

plural black level value calculating circuits configured to respectively obtain, per each line, black level values employed for said black-shading compensation from said image data by use of respective different calculation members;

a selection circuit configured to select and output one black level value among the black level values outputted by said plural black level value calculating circuits; and a subtracter configured to subtract said selected black level value from said image data after performing said analog-to-digital conversion and said black-shading compensation.

2. The image reading-out apparatus as defined in claim 1, further comprising:

a control member configured to perform the selection for said image data by use of said selection circuit in accordance with the black level values of the processing performed at a stage subsequent to said black-shading compensation circuit.

3. The image reading-out apparatus as defined in claim 2, wherein one of said plural black level value calculating circuits is a first calculation circuit which is configured to calculate said black level value on a basis of the image data per line inputted at a first time and the image data per at least line inputted until a second time; and wherein another one of said plural black level value calculating circuits is a second calculation circuit which is configured to calculate said black level value only on the basis of the image data per line inputted at a first time, and wherein said second time precedes said first time.

4. The image reading-out apparatus as defined in claim 3, wherein the processing performed at the stage subsequent to that of said black-shading compensation circuit include first processing and second processing;

wherein the first processing is a processing of amplifying the influence exerted by the noise on said image data to a larger extent than the second processing;

wherein the second processing is a processing less affected by said noise than the first processing;

wherein, in the case of performing said first processing, said control member causes the black level from said first calculation circuit to be outputted from said selection circuit; and wherein, in the case of performing said second processing, said control member causes the black level from said second calculation circuit to be outputted from said selection circuit.

5. The image reading-out apparatus as defined in claim 4, wherein said first processing is an MTF compensation.

6. The image reading-out apparatus as defined in claim 4, wherein said second processing is a smoothing processing.

7. The image reading-out apparatus as defined in claim 5, wherein said second processing is a smoothing processing.

8. A copying machine comprising:

an image reading-out apparatus for exposing and scanning an original document to read out an image on the original document and thereby obtaining image data; and an image forming apparatus for forming an image on the basis of the image data obtained by said image reading-out apparatus, said image forming apparatus comprising a background level detecting circuit configured to detect a background level of said original document from said image data;

an analog-to-digital converter configured to remove an influence due to the color of said background level on said original document from said image data and configured to perform an analog-to-digital conversion of said image data in accordance with said detected background level; and a black-shading compensation circuit configured to perform a black-shading compensation of said image data after said analog-to-digital conversion, wherein said black-shading compensation circuit comprises:

plural black level value calculating circuits configured to respectively obtain, per each line, black level values employed for said black-shading compensation from said image data by use of respective different calculation members;

a selection circuit configured to select and output one black level value among the black level values outputted by said plural black level value calculating circuits; and a subtracter configured to subtract said selected black level value from said image data after performing said analog-to-digital conversion and said black-shading compensation.

9. A facsimile device comprising:

an image reading-out apparatus for exposing and scanning an original document to read out an image on the original document and thereby obtaining image data;

a transmitting/receiving apparatus for transmitting the image data obtained by said image reading-out apparatus to a network and receiving the image data from said network; and an image forming apparatus for forming the image on the basis of the image data received by said transmitting/receiving apparatus, wherein said image reading-out apparatus comprises:

a background level detecting circuit configured to detect a background level of said original document from said image data;

an analog-to-digital converter configured to remove an influence due to the color of said background level on said original document from said image data and configured to perform an analog-to-digital conversion of said image data in accordance with said detected background level; and a black-shading compensation circuit configured to perform a black-shading compensation of said image data after said analog-to-digital conversion, wherein said black-shading compensation circuit comprises:

plural black level value calculating circuits configured to respectively obtain, per each line, black level values employed for said black-shading compensation from said image data by use of respective different calculation members;

a selection circuit configured to select and output one black level value among the black level values outputted by said plural black level value calculating circuits; and a subtracter configured to subtract said selected black level value from said image data after performing said analog-to-digital conversion and said black-shading compensation.

10. An image reading-out apparatus for exposing and scanning an original document to read out an image on said original document and thereby obtaining image data, comprising:

background level detecting means for detecting a background level of said original document from said image data;

analog-to-digital conversion means for removing an influence due to the color of said background level on said original document from said image data and performing an analog-to-digital conversion of said image data in accordance with said detected background level; and black-shading compensation means for performing a black-shading compensation of said image data after said analog-to-digital conversion, wherein said black-shading compensation means comprises:

plural black level value calculating means for respectively obtaining, per each line, black level values employed for said black-shading compensation from said image data by use of respective different calculation members;

selection means for selecting and outputting one black level value among black level values outputted by said plural black level value calculating means; and subtraction means for subtracting said selected black level value from said image data after said analog-to-digital conversion and performing said black-shading compensation.

11. The image reading-out apparatus as defined in claim 10, further comprising:

control means for performing a selection for said image data by use of said selection means in accordance with the processing performed at a stage subsequent to that of said black-shading compensation means.

12. The image reading-out apparatus as defined in claim 11, wherein one of said plural black level value calculating means is a first calculation means for calculating said black level value on the basis of the image data per line inputted at a first time and the image data per at least one line inputted until a second time; and wherein another one of said plural black level value calculating means is a second calculation means for calculating said black level value only on the basis of the image data per line inputted at the first time, and wherein the second time precedes the first time.

13. The image reading-out apparatus as defined in claim 12, wherein the processing performed at the stage subsequent to that of said black-shading compensation means include first processing and second processing;

wherein the first processing is a processing of amplifying the influence exerted by the noise on said image data to a larger extent than the second processing;

wherein the second processing is a processing less affected by said noise than the first processing;

wherein, in the case of performing said first processing, said control means causes the black level from said first calculation means to be outputted from said selection means; and wherein, in the case of performing said second processing, said control means causes the black level from said second calculation means to be outputted from said selection means.

14. The image reading-out apparatus as defined in claim 13, wherein said first processing is an MTF compensation.

15. The image reading-out apparatus as defined in claim 13, wherein said second processing is a smoothing processing.

16. The image reading-out apparatus as defined in claim 14, wherein said second processing is a smoothing processing.

17. A copying machine comprising:

an image reading-out apparatus for exposing and scanning an original document to read out an image on the original document and thereby obtaining image data: and an image forming apparatus for forming an image on a basis of the image data obtained by said image reading-out apparatus which comprises:

background level detecting means for detecting a background level of said original document from said image data;

analog-to-digital conversion means for removing an influence due to the color of said background level on said original document from said image data and performing an analog-to-digital conversion of said image data in accordance with said detected background level; and black-shading compensation means for performing a black-shading compensation of said image data after said analog-to-digital conversion, wherein said black-shading compensation means comprises:

plural black level value calculating means for respectively obtaining, per each line, black level values employed for said black-shading compensation from said image data by use of respective different calculation members;

selection means for selecting and outputting one black level value among the black level values outputted by said plural black level value calculating means; and subtraction means for subtracting said selected black level value from said image data after said analog-to-digital conversion and performing said black-shading compensation.

18. A facsimile device comprising:

an image reading-out apparatus for exposing and scanning an original document to read out an image on the original document and thereby obtaining image data:

a transmitting/receiving apparatus for transmitting the image data obtained by said image reading-out apparatus to a network and receiving the image data from said network; and an image forming apparatus for forming the image on a basis of the image data received by said transmitting/receiving apparatus, wherein said image reading-out apparatus comprises:

background level detecting means for detecting a background level of said original document from said image data;

analog-to-digital conversion means for removing an influence due to the color of said background level on said original document from said image data and performing an analog-to-digital conversion of said image data in accordance with said detected background level; and black-shading compensation means for performing a black-shading compensation of said image data after said analog-to-digital conversion, wherein said black-shading compensation means comprises:

plural black level value calculating means for respectively obtaining, per each line, black level values employed for said black-shading compensation from said image data by use of respective different calculation members;

selection means for selecting and outputting one black level value among black level values outputted by said plural black level value calculating means; and subtraction means for subtracting said selected black level value from said image data after said analog-to-digital conversion and performing said black-shading compensation.

19. A method of reading out an image on an original document by exposing and scanning said original document and thereby obtaining image data comprising:

detecting a background level of said original document from said image data;

removing an influence due to the color of the background level on said original document from said image data;

performing an analog-to-digital conversion of said image data in accordance with said detected background level; and performing a black-shading compensation of said image data after said analog-to-digital conversion, wherein said black-shading compensation comprises:

respectively obtaining, per each line, plural black level values employed for said black-shading compensation from said image data by use of respective different calculation members;

selecting and outputting one black level value among plural types of black level values outputted by the plural black level value calculating members; and subtracting said selected black level value from said image data after said analog-to-digital conversion and performing said black-shading compensation.

20. The method of reading out the image on the original document as defined in claim 19, further comprising:

performing a selection for said image data by use of a selection circuit in accordance with the plural of black level value calculation steps performed at a stage subsequent to said black-shading compensation.

21. The method of reading out the image on the original document as defined in claim 20, wherein a first calculating step of said plural black level value calculating steps performs a first calculation step of calculating said black level value on a basis of the image data per line inputted at a first time and the image data per at least one line inputted until a second time; and wherein a second calculating step of said plural black level value calculating steps performs a second calculation step of calculating said black level value only on a basis of the image data per line inputted at the first time, and wherein said second time precedes said first time.

22. The method of reading out the image on the original document as defined in claim 21, wherein processing performed at the stage subsequent to that of said step of performing a black-shading compensation further includes first processing and second processing;

wherein the first processing is a processing of amplifying the influence exerted by the noise on said image data to a larger extent than the second processing;

wherein the second processing is a processing less affected by said noise than the first processing;

wherein, in the case of performing said first processing, said control member causes the black level from said first calculating step to be outputted from said selection circuit; and wherein, in the case of performing said second processing, said control member causes the black level from said second calculating step to be outputted from said selection circuit.

23. The method of reading out the image on the original document as defined in claim 22, wherein said first processing is an MTF compensation.

24. The method of reading out the image on the original document as defined in claim 22, wherein said second processing is a smoothing processing.

25. The method of reading out the image on the original document as defined in claim 23, wherein said second processing is a smoothing processing.

* * * * *